United States Patent
Tamada

(10) Patent No.: US 11,680,526 B2
(45) Date of Patent: Jun. 20, 2023

(54) GAS TURBINE SYSTEM

(71) Applicant: HONDA MOTOR CO., LTD., Tokyo (JP)

(72) Inventor: Shunichiro Tamada, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/692,257

(22) Filed: Mar. 11, 2022

(65) Prior Publication Data

US 2022/0298970 A1    Sep. 22, 2022

(30) Foreign Application Priority Data

Mar. 17, 2021 (JP) .............................. JP2021-043564

(51) Int. Cl.
*F02C 7/14* (2006.01)
*F23R 3/04* (2006.01)
*F23R 3/16* (2006.01)

(52) U.S. Cl.
CPC ................ *F02C 7/14* (2013.01); *F23R 3/045* (2013.01); *F23R 3/16* (2013.01)

(58) Field of Classification Search
CPC ...... F02C 6/00; F02C 6/06; F02C 6/08; F02C 3/107; F02C 3/113; F02C 3/13; F02C 3/14; F02C 7/12; F02C 7/14; F02C 7/32
See application file for complete search history.

(56) References Cited

U.S. PATENT DOCUMENTS

| | | | |
|---|---|---|---|
| 11,015,523 B2* | 5/2021 | Terwilliger | B60L 50/10 |
| 11,542,874 B2* | 1/2023 | Tamada | F02C 9/42 |
| 2013/0213048 A1* | 8/2013 | Stucki | F02B 37/105 60/39.21 |
| 2016/0273397 A1* | 9/2016 | Ekanayake | F02C 6/08 |
| 2018/0216499 A1* | 8/2018 | Mathai | F01K 13/003 |
| 2019/0292986 A1* | 9/2019 | Honma | F02C 7/185 |
| 2020/0355118 A1* | 11/2020 | Takata | F01D 13/003 |
| 2022/0298970 A1* | 9/2022 | Tamada | F02C 9/18 |

* cited by examiner

*Primary Examiner* — Craig Kim

(74) *Attorney, Agent, or Firm* — Amin, Turocy & Watson, LLP

(57) ABSTRACT

The gas turbine system includes: a first gas turbine element 2; a second gas turbine element 3; a single combustor 4; a first supply pipe 61 which connects the first compressor 21 to the combustor 4; a second supply pipe 62 which connects the second compressor 31 to the combustor 4; a first discharge pipe 66 and a second discharge pipe 67 which discharge a fluid discharged from the combustor 4 to the outside; and a heat exchanger 5. The heat exchanger 5 allows each of a low-temperature fluid flowing through the first supply pipe 61 and the second supply pipe 62 and a high-temperature fluid flowing through the first discharge pipe 66 and the second discharge pipe 67 to flow therethrough and exchanges heat between the low-temperature fluid and the high-temperature fluid.

9 Claims, 6 Drawing Sheets

GAS TURBINE SYSTEM

CROSS-REFERENCE TO RELATED APPLICATION

Priority is claimed on Japanese Patent Application No. 2021-043564 filed Mar. 17, 2021, the content of which is incorporated herein by reference.

BACKGROUND OF THE INVENTION

Field of the Invention

The present invention relates to a gas turbine system.

Description of Related Art

Conventionally, a gas turbine system which is mounted on an airframe of an aircraft or the like and uses a gas turbine engine as a power source for propelling the airframe is known. In such a gas turbine system, for example, various techniques for obtaining a high output in a high load state such as a take-off/landing state are proposed.

For example, Patent Document 1 (US Patent No. 2013/0213048) discloses a configuration in which a plurality of compressors and a plurality of turbines are respectively directly connected to a plurality of rotation shafts and compressed air is supplied from the plurality of compressors to a single combustor. According to the technique of Patent Document 1, since the compressed air is supplied from the plurality of compressors to the single combustor, a high output can be obtained in a high load state such as a take-off/landing state.

SUMMARY OF THE INVENTION

However, in the technique of Patent Document 1 in which the plurality of compressors and turbines are simply combined with the single combustor, a high output can be easily generated in a high load state. However, for example, in a low load state when the aircraft is in a cruising state or the like, there is a risk that unnecessary fuel consumption may occur. Accordingly, there is a risk that fuel efficiency may decrease. In addition, since the thermal efficiency of the gas turbine engine is likely to be lower than other internal-combustion engines, there is a risk that the fuel efficiency may further decrease.

Thus, there remains a problem in improving fuel efficiency in the technique described in Patent Document 1.

Here, an object of the present invention is to provide a gas turbine system improving fuel efficiency compared to a related art.

In order to solve the above-described problems, the gas turbine system according to the invention has the following configurations.

(1) A gas turbine system according to an aspect of the present invention includes: a first gas turbine element which includes a first compressor and a first turbine rotating together with the first compressor; a second gas turbine element which includes a second compressor and a second turbine rotating together with the second compressor; a single combustor which is connected to each of the first gas turbine element and the second gas turbine element; a first supply pipe which connects the first compressor to the combustor and allows air compressed by the first compressor to flow toward an intake port of the combustor; a second supply pipe which connects the second compressor to the combustor and allows air compressed by the second compressor to flow toward the intake port of the combustor; a compressor communication pipe which allows an outlet of the first compressor to communicate with an inlet of the second compressor; a first discharge pipe which discharges a fluid discharged from the combustor and flowing into the first turbine to the outside; a second discharge pipe which discharges the fluid discharged from the combustor and flowing into the second turbine to the outside; a heat exchanger which allows each of a low-temperature fluid flowing through the first supply pipe and the second supply pipe and a high-temperature fluid flowing through the first discharge pipe and the second discharge pipe to flow therethrough and exchanges heat between the low-temperature fluid and the high-temperature fluid; a first on-off valve which is provided in the first supply pipe and is able to interrupt the flow of air in the first supply pipe; a second on-off valve which is provided on the upstream side of the inlet of the second compressor in an air flow direction and is able to interrupt the flow of air into the second compressor; and a third on-off valve which is provided in the compressor communication pipe and is able to interrupt the flow of air in the compressor communication pipe.

(2) The gas turbine system according to the aspect (1) may further include: a first outlet pipe which connects the combustor to the first turbine and allows the fluid discharged from the combustor to flow toward the first turbine; a second outlet pipe which connects the combustor to the second turbine and allows the fluid discharged from the combustor to flow toward the second turbine; a turbine communication pipe which allows the second discharge pipe to communicate with the first outlet pipe; a fourth on-off valve which is provided in a connection portion between the second discharge pipe and the turbine communication pipe and is able to interrupt the flow of the fluid into the turbine communication pipe; and a fifth on-off valve which is provided in a connection portion between the first outlet pipe and the turbine communication pipe and is able to interrupt the flow of the fluid from the turbine communication pipe toward the first turbine, the fourth on-off valve and the fifth on-off valve may be three-way valves, and in a large output operation mode in which a required output for the first gas turbine element and the second gas turbine element is larger than a predetermined value, an operation of opening the first on-off valve and the second on-off valve and closing the third on-off valve may be performed, the fourth on-off valve may be opened and closed so that the flow of the fluid toward the turbine communication pipe is interrupted and the fluid flows through the second discharge pipe, and the fifth on-off valve may be opened and closed so that the flow of the fluid from the turbine communication pipe toward the first outlet pipe is interrupted and the fluid flows through the first outlet pipe.

(3) In the gas turbine system according to the aspect (2), in a small output operation mode in which the required output for the first gas turbine element and the second gas turbine element is smaller than the predetermined value, an operation of closing the first on-off valve and the second on-off valve and opening the third on-off valve may be performed, the fourth on-off valve may be opened and closed so that the fluid flows from the second discharge pipe toward the turbine communication pipe and the discharged of the fluid from the second discharge pipe to the outside is interrupted, and the fifth on-off valve may be opened and closed so that the fluid flows from the turbine communication pipe toward the first outlet pipe and the flow of the fluid from the combustor toward the first turbine in the first outlet pipe is interrupted.

(4) A gas turbine system according to an aspect of the present invention includes: a first gas turbine element which includes a first compressor and a first turbine connected to the first compressor through a first rotation shaft and rotating together with the first compressor; a second gas turbine element which includes a second compressor and a second turbine connected to the second compressor through a second rotation shaft and rotating together with the second compressor; a single combustor which is connected to each of the first gas turbine element and the second gas turbine element; a first supply pipe which connects the first compressor to the combustor and allows air compressed by the first compressor to flow toward an intake port of the combustor; a second supply pipe which connects the second compressor to the combustor and allows air compressed by the second compressor to flow toward the intake port of the combustor; a first outlet pipe which connects the combustor to the first turbine and allows air discharged from the combustor to flow toward the first turbine; a second outlet pipe which connects the combustor to the second turbine and allows the air discharged from the combustor to flow toward the second turbine; a first discharge pipe which discharges a fluid discharged from the first turbine to the outside; a second discharge pipe which discharges a fluid discharged from the second turbine to the outside; and a heat exchanger which allows each of a low-temperature fluid flowing through the first supply pipe and the second supply pipe and a high-temperature fluid flowing through the first discharge pipe and the second discharge pipe to flow therethrough and exchanges heat between the low-temperature fluid and the high-temperature fluid, the first gas turbine element includes a first generator which is connected to the first rotation shaft and is disposed between the first compressor and the first turbine in an axial direction of the first rotation shaft, and the second gas turbine element includes a second generator which is connected to the second rotation shaft and is disposed between the second compressor and the second turbine in an axial direction of the second rotation shaft.

(5) The gas turbine system according to the aspect (4) may further include: a sixth on-off valve which is provided in the first supply pipe and is able to interrupt the flow of air in the first supply pipe; a seventh on-off valve which is provided in the first outlet pipe and is able to interrupt the flow of air in the first outlet pipe; an eighth on-off valve which is provided in the first discharge pipe and is able to interrupt the flow of air in the first discharge pipe; a ninth on-off valve which is provided in the second supply pipe and is able to interrupt the flow of air in the second supply pipe; a tenth on-off valve which is provided in the second outlet pipe and is able to interrupt the flow of air in the second outlet pipe; and an eleventh on-off valve which is provided in the second discharge pipe and is able to interrupt the flow of air in the second discharge pipe, a first operation mode in which an output value is larger than a predetermined value and a second operation mode in which the output value is smaller than the predetermined value may be switchable, and in the second operation mode, an operation of one of the first gas turbine element and the second gas turbine element may be stopped and the on-off valve provided in the supply pipe, the outlet pipe, and the discharge pipe connected to the stopped gas turbine element may be closed.

(6) In the gas turbine system according to any one of the aspects (2) to (5), the combustor may include a first intake port connected to the first supply pipe, a second intake port connected to the second supply pipe, a first exhaust port connected to the first outlet pipe, a second exhaust port connected to the second outlet pipe, and a shielding wall provided in the combustor, and the shielding wall may divide a space in the combustor into a first space communicating with the first intake port and the first exhaust port and a second space communicating with the second intake port and the second exhaust port.

According to the aspect (1), the gas turbine system includes two gas turbine elements and the single combustor. Accordingly, it is possible to decrease the number of components and decrease the weight of the entire gas turbine system as compared with the case in which the plurality of combustors are provided. Since the weight of the gas turbine system is decreased, it is possible to improve the fuel efficiency of the gas turbine system by suppressing fuel consumption.

The gas turbine system includes the heat exchanger. Each of the low-temperature fluid (air) flowing through the first supply pipe and the second supply pipe and the high-temperature fluid (combustion gas) flowing through the first discharge pipe and the second discharge pipe flows through the heat exchanger. Since these fluids flow through the heat exchanger, heat is exchanged between the low-temperature fluid and the high-temperature fluid. Accordingly, the air to flow into the combustor can be heated by using the heat of the high-temperature fluid discharged after combustion. Since the heated air is burned, the thermal efficiency of the combustor can be improved compared with the related art that burns cool air sucked from the external air. Furthermore, the heat of the high-temperature fluid, which was conventionally discarded as an exhaust gas, can be effectively used. Thus, the energy efficiency related to combustion can be improved and the fuel efficiency of the gas turbine system can be improved.

The pipes of the gas turbine system are respectively provided with the first to third on-off valves. By opening and closing these on-off valves, it is possible to change the flow path of the fluid and to change the magnitude of the output or the combustion efficiency of the gas turbine system or the like. Accordingly, the gas turbine system can be used in the optimum state in each of the plurality of operation modes, for example, at a high load state when the aircraft is in a take-off/landing state or the like and a low load state when the aircraft is in a cruising state. Thus, the fuel efficiency of the gas turbine system can be improved compared with the related art.

Thus, it is possible to provide the gas turbine system having fuel efficiency improved compared with the related art.

According to the aspect (2), the fourth on-off valve is the three-way valve provided in the connection portion between the second discharge pipe and the turbine communication pipe. The fifth on-off valve is the three-way valve provided in the connection portion between the first outlet pipe and the turbine communication pipe. The gas turbine system can be switched between the large output operation mode in which the required output is larger than the predetermined value and the small output operation mode in which the required output is smaller than the predetermined value. In the large output operation mode corresponding to the high load state, the first on-off valve and the second on-off valve are opened and the third on-off valve is closed. The fourth on-off valve is opened and closed so that the flow of the fluid toward the turbine communication pipe is interrupted and the fluid flows through the second discharge pipe. The fifth on-off valve is opened and closed so that the flow of the fluid from the turbine communication pipe toward the first outlet pipe is interrupted and the fluid flows through the first outlet pipe. Accordingly, the air flowing into the first compressor is discharged while sequentially flowing through the heat exchanger, the combustor, the first turbine, and the heat exchanger. Similarly, the air flowing into the second compressor is discharged while sequentially flowing through the heat exchanger, the combustor, the second turbine, and the heat exchanger. In this way, in the large output operation mode, the air compressed by each compressor flows into the single combustor. Thus, since the amount of the air flowing into the combustor increases, a high output can be obtained from the gas turbine system. Thus, it is possible to perform a suitable operation mode particularly at a high load state when the aircraft is in a take-off/landing state.

According to the aspect (3), in the small output operation mode corresponding to the low load state, the first on-off valve and the second on-off valve are closed and the third on-off valve is opened. The fourth on-off valve is opened and closed so that the fluid flows from the second discharge pipe toward the turbine communication pipe and the discharge of the fluid from the second discharge pipe to the outside is interrupted. The fifth on-off valve is opened and closed so that the fluid flows from the turbine communication pipe toward the first outlet pipe and the flow of the fluid from the combustor toward the first turbine in the first outlet pipe is interrupted. Accordingly, the air flowing into the first compressor is discharged while sequentially flowing through the second compressor, the heat exchanger, the combustor, the second turbine, the first turbine, and the heat exchanger. The air is compressed in multiple stages by the first compressor and the second compressor and is supplied to the combustor. In this way, since the air having a pressure increased by the multi-stage compression is supplied to the combustor in the small output operation mode, the energy efficiency can be increased by improving the engine cycle. Thus, it is possible to realize low fuel consumption of the gas turbine system at the low load state. Thus, the fuel efficiency of the gas turbine system particularly at a low load can be improved compared with the related art.

By opening and closing each of the first to fifth on-off valves, the above-described modes can be easily switched. Accordingly, it is possible to optimize the operation of the gas turbine system in response to the required output (the magnitude of the load) while suppressing an excessive increase in weight. Thus, the fuel efficiency of the gas turbine system or the like can be improved.

According to the aspect (4), the gas turbine system includes two gas turbine elements and the single combustor. Accordingly, it is possible to decrease the number of components and decrease the weight of the entire gas turbine system as compared with the case in which the plurality of combustors are provided. Since the weight of the gas turbine system is decreased, it is possible to improve the fuel efficiency of the gas turbine system.

The gas turbine system includes the heat exchanger. Each of the low-temperature fluid (air) flowing through the first supply pipe and the second supply pipe and the high-temperature fluid (combustion gas) flowing through the first discharge pipe and the second discharge pipe flows through the heat exchanger. The heat exchanger exchanges heat between the low-temperature fluid and the high-temperature fluid. Accordingly, the air to flow into the combustor can be heated by using the heat of the high-temperature fluid discharged after combustion. Since the heated air is burned, the thermal efficiency of the combustor can be improved compared with the related art that burns cool air sucked from the external air. Furthermore, the heat of the high-temperature fluid, which was conventionally discarded as an exhaust gas, can be effectively used. Thus, the energy efficiency related to combustion can be improved and the fuel efficiency of the gas turbine system can be improved.

The first generator is provided between the first compressor and the first turbine in the axial direction of the first rotation shaft. The second generator is provided between the second compressor and the second turbine in the axial direction of the second rotation shaft. In this way, since each generator is disposed between the compressor and the turbine, it is possible to shorten the axial length of the entire gas turbine element by effectively using the space between the compressor and the turbine in the axial direction. Thus, it is possible to decrease the weight of the gas turbine system by suppressing an increase in size of the gas turbine system. Thus, it is possible to improve the fuel efficiency of the gas turbine system.

Thus, it is possible to provide the gas turbine system having fuel efficiency improved compared with the related art.

According to the aspect (5), the sixth on-off valve is provided in the first supply pipe. The seventh on-off valve is provided in the first outlet pipe. The eighth on-off valve is provided in the first discharge pipe. The ninth on-off valve is provided in the second supply pipe. The tenth on-off valve is provided in the second outlet pipe. The eleventh on-off valve is provided in the second discharge pipe. By opening and closing these on-off valves, it is possible to change the flow path of the fluid and to change the magnitude of the output or the combustion efficiency of the gas turbine system. Accordingly, the gas turbine system can be used in the optimum state in each of the plurality of operation modes, for example, at a high load state when the aircraft is in a take-off/landing state or the like and a low load state when the aircraft is in a cruising state or the like. Thus, the fuel efficiency of the gas turbine system can be improved as compared with the related art.

In the second operation mode corresponding to the low load state, one gas turbine element of two gas turbine elements is stopped. At this time, the on-off valve provided in each pipe connected to the stopped gas turbine element is closed. Accordingly, the other gas turbine element can be operated while stopping the operation of one gas turbine element. At this time, the flow of air between the stopped gas turbine element and the combustor and between the stopped gas turbine element and the operated gas turbine element is interrupted by the on-off valve. Therefore, the air flowing through the operating gas turbine element does not flow out toward the stopped gas turbine element. Thus, it is possible to suppress the generation of excessive electric power at the low load state by stably operating only one gas turbine element. Thus, it is possible to further improve the fuel efficiency of the gas turbine system in addition to improving the thermal efficiency of the heat exchanger.

According to the aspect (6), the combustor includes the shielding wall therein. The shielding wall divides the space in the combustor into the first space communicating with the first intake port and the first exhaust port and the second space communicating with the second intake port and the second exhaust port. Accordingly, for example, when one gas turbine element of two gas turbine elements is stopped, the high-temperature air is suppressed from flowing from the combustor toward the stopped gas turbine element. Thus, it is possible to suppress a component such as the on-off valve provided in the stopped gas turbine element or the like from being damaged by heat.

When both of two gas turbine elements are operated, a uniform flow rate of fluid (combustion gas) can be supplied to both turbines by the shielding wall. Thus, the energy efficiency of the gas turbine element is improved and the fuel efficiency of the gas turbine system can be improved.

DETAILED DESCRIPTION OF THE INVENTION

Hereinafter, embodiments of the present invention will be described with reference to the drawings.

First Embodiment (Gas Turbine System)

Figure 1:
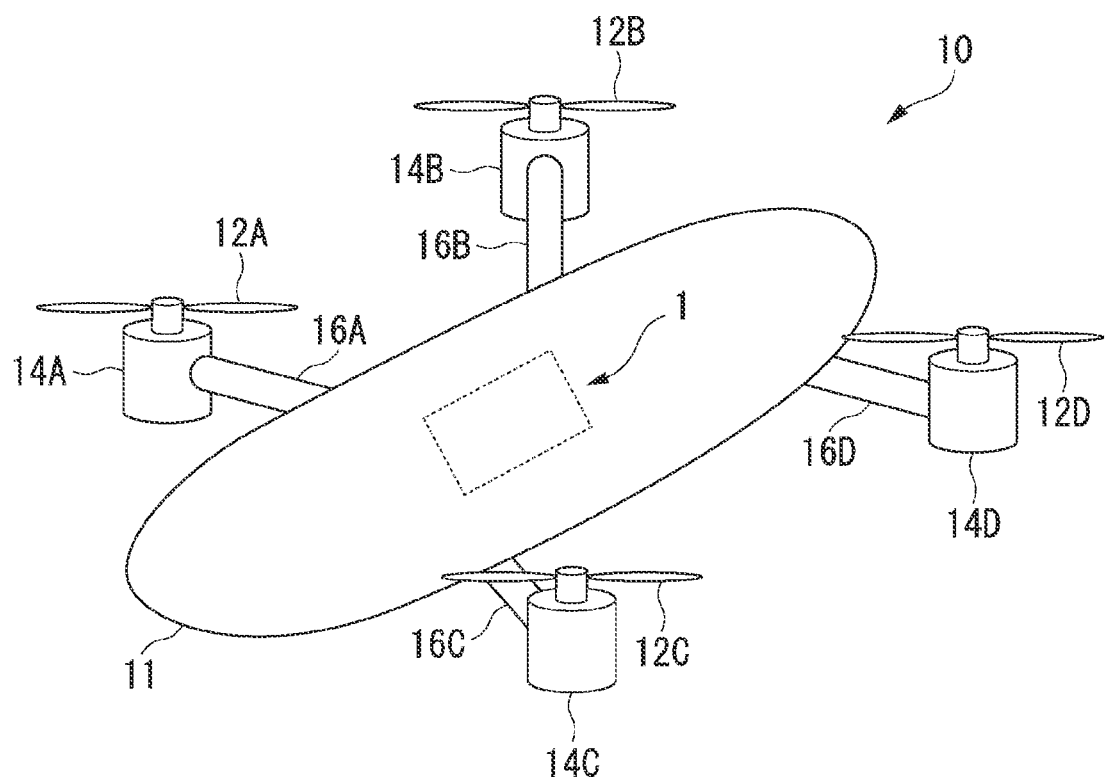
FIG. 1 is an external view of an aircraft equipped with a gas turbine system according to a first embodiment.

FIG. 1 is an external view of an aircraft 10 equipped with a gas turbine system 1 according to a first embodiment.

The aircraft 10 includes, for example, an airframe 11, a plurality of rotors 12A to 12D, a plurality of electric motors 14A to 14D, attachment members 16A to 16D, and a gas turbine system 1. Hereinafter, the plurality of rotors 12A to 12D are referred to as rotors 12 when they are not distinguished from each other and the plurality of electric motors 14A to 14D are referred to as electric motors 14 when they are not distinguished from each other.

The rotor 12A is attached to the airframe 11 through the attachment member 16A. The electric motor 14A is attached to the base portion (rotation shaft) of the rotor 12A. The electric motor 14A drives the rotor 12A. The electric motor 14A is, for example, a brushless DC motor. The rotor 12A is a fixed blade which rotates about an axis parallel to the direction of gravity when the aircraft 10 takes a horizontal posture. Since the rotors 12B to 12D, the attachment members 16B to 16D, and the electric motors 14B to 14D also have the same functional configurations, the description will be omitted.

The aircraft 10 flies in a desired flight state by rotating the rotor 12 in response to a control signal. The control signal is a signal for controlling the aircraft 10 based on the operation of the operator or the instruction in the autopilot. For example, when the rotor 12A and the rotor 12D rotate in a first direction (for example, a clockwise direction) and the rotor 12B and the rotor 12C rotate in a second direction (for example, a counterclockwise direction), the aircraft 10 flies. In addition to the above-described rotor 12, an auxiliary rotor for maintaining a posture or for horizontal propulsion (not shown) may be provided.

Figure 2:
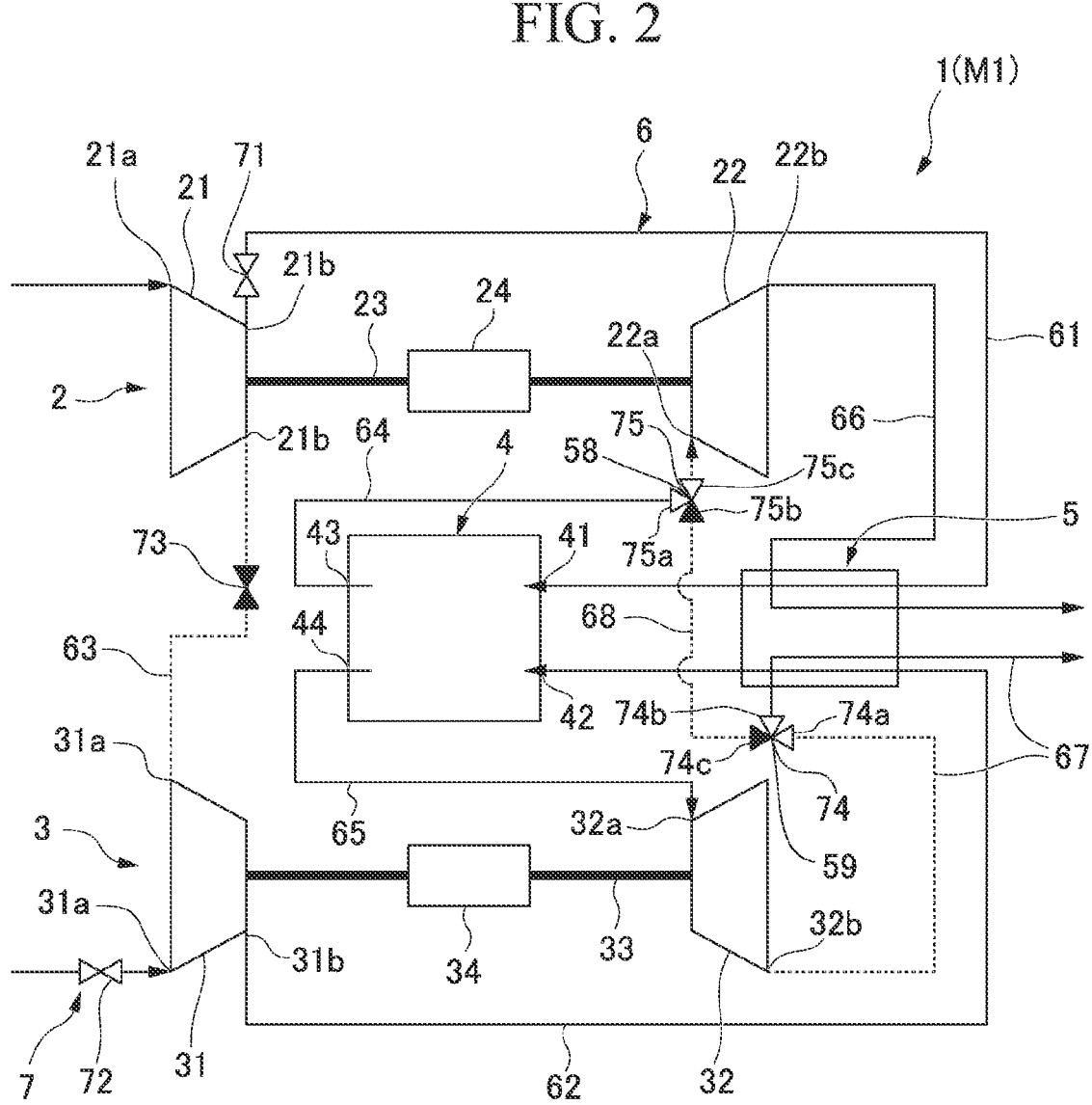
FIG. 2 is a schematic configuration diagram of a gas turbine system (large output operation mode) according to the first embodiment.

FIG. 2 is a schematic configuration diagram of the gas turbine system 1 (large output operation mode M1) according to the first embodiment.

The gas turbine system 1 is mounted inside the aircraft 10. The gas turbine system 1 generates electric power that is a power source for driving the rotors 12A to 12D (see FIG. 1) or the like of the aircraft 10. The gas turbine system 1 is configured as a so-called gas turbine engine. The gas turbine system 1 includes a first gas turbine element 2, a second gas turbine element 3, a single combustor 4, a heat exchanger 5, a plurality of pipes 6, and a plurality of on-off valves 7.

(Gas Turbine Element)

The first gas turbine element 2 includes a first compressor 21, a first turbine 22, a first rotation shaft 23, and a first generator 24. The first compressor 21 compresses intake air sucked from a ventilation hole (not shown) provided in the airframe 11 of the aircraft 10. The first turbine 22 is connected to the first compressor 21 and rotates together with the first compressor 21. The first rotation shaft 23 connects the first compressor 21 to the first turbine 22. The first rotation shaft 23 extends, for example, along a direction parallel to the front and rear direction (yaw axis) of the airframe 11. The first compressor 21 is connected to the front end portion of the first rotation shaft 23. The first turbine 22 is connected to the rear end portion of the first rotation shaft 23.

The first generator 24 is disposed between the first compressor 21 and the first turbine 22. The first generator 24 is provided coaxially with the first rotation shaft 23 and is connected to the first rotation shaft 23 through a reduction mechanism or the like. The first generator 24 generates electric power (AC power) by driving the first turbine 22. The AC power generated by the first generator 24 is converted into DC power by a converter of a power drive unit (PDU) (not shown) and stored in a battery (not shown). The electric motor 14 is driven by supplying the electric discharge power from the battery to the electric motor 14.

The second gas turbine element 3 is provided in parallel to the first gas turbine element 2. The configuration of the second gas turbine element 3 is the same as the configuration of the first gas turbine element 2. That is, the second gas turbine element 3 includes a second compressor 31, a second turbine 32, a second rotation shaft 33, and a second generator 34. The second compressor 31 compresses intake air sucked from a ventilation hole (not shown) provided in the airframe 11. The second turbine 32 is connected to the second compressor 31 and rotates together with the second compressor 31. The second rotation shaft 33 connects the second compressor 31 to the second turbine 32.

The second generator 34 is disposed between the second compressor 31 and the second turbine 32. The second generator 34 is provided coaxially with the second rotation shaft 33 and is connected to the second rotation shaft 33 through a reduction mechanism or the like. The second generator 34 generates electric power (AC power) by driving the second turbine 32. The AC power generated by the second generator 34 is converted into DC power by a converter of a power drive unit (PDU) (not shown) and stored in a battery (not shown). Additionally, in this embodiment, the first generator 24 and the second generator 34 are connected to a common battery to store electric power, but the first generator 24 and the second generator 34 may be connected to different batteries to store electric power in the respective batteries.

In the following description, the portions which are located on the upstream side in the air flow direction and into which air flows in the compressors 21 and 31 and the turbines 22 and 32 may be referred to as "inlets 21a, 22a, 31a, and 32a". The portions which are located on the downstream side in the air flow direction and from which air is discharged may be referred to as "outlets 21b, 22b, 31b, and 32b".

(Combustor)

One combustor 4 is provided for two gas turbine elements (the first gas turbine element 2 and the second gas turbine element 3). The combustor 4 is disposed between the first gas turbine element 2 and the second gas turbine element 3. The combustor 4 is disposed between each of the compressors 21 and 31 and each of the turbines 22 and 32 in the axial direction of each of the gas turbine elements 2 and 3. Specifically, the combustor 4 includes two intake ports (a first intake port 41 and a second intake port 42). The first intake port 41 and the second intake port 42 are provided behind the outlet 21b of the first compressor 21 and the outlet 31b of the second compressor 31. The combustor 4 includes two exhaust ports (a first exhaust port 43 and a second exhaust port 44). The first exhaust port 43 and the second exhaust port 44 are provided in front of the inlet 22a of the first turbine 22 and the inlet 32a of the second turbine 32. The combustor 4 is connected to each of the first gas turbine element 2 and the second gas turbine element 3. Compressed air from at least one of the first compressor 21 and the second compressor 31 flows into the combustor 4.

(Heat Exchanger)

Figure 3:
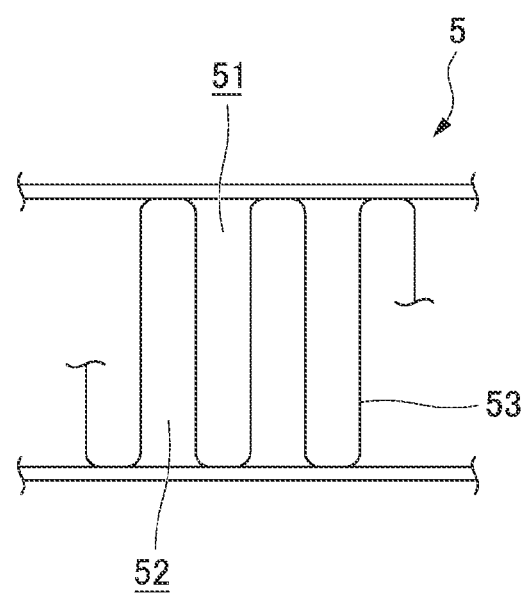
FIG. 3 is a partially cross-sectional view of a heat exchanger according to the first embodiment.

FIG. 3 is a partially cross-sectional view of the heat exchanger 5 according to the first embodiment.

As shown in FIGS. 2 and 3, the heat exchanger 5 is configured to exchange heat between air having not flowed into the combustor 4 and a combustion gas discharged from the combustor 4 by allowing them to flow therein. As shown in FIG. 3, the heat exchanger 5 includes a low temperature side flow path 51 and a high temperature side flow path 52. A low-temperature fluid (air) which has not flowed into the combustor 4 and is compressed by the first compressor 21 and the second compressor 31 flows through the low temperature side flow path 51. A high-temperature fluid (combustion gas) which has been discharged from the combustor 4, is discharged from the first turbine 22 and the second turbine 32, and has a higher temperature than that of the low-temperature fluid flows through the high temperature side flow path 52.

The low temperature side flow path 51 and the high temperature side flow path 52 are divided by a heat transfer plate 53. The heat transfer plate 53 is formed in a bellows pattern in a cross-sectional view by, for example, bending plate members of metal or the like having high thermal conductivity alternately on the front and back surfaces. The front surface of the heat transfer plate 53 faces the low temperature side flow path 51. The back surface the heat transfer plate 53 faces the high temperature side flow path 52. Thus, the heat exchanger 5 exchanges heat between the low-temperature fluid and the high-temperature fluid through the heat transfer plate 53.

(Pipes)

As shown in FIG. 2, the plurality of pipes 6 include a first supply pipe 61, a second supply pipe 62, a compressor communication pipe 63, a first outlet pipe 64, a second outlet pipe 65, a first discharge pipe 66, a second discharge pipe 67, and a turbine communication pipe 68.

The first supply pipe 61 connects the outlet 21b of the first compressor 21 to the first intake port 41 of the combustor 4. The first supply pipe 61 allows air compressed by the first compressor 21 to flow toward the combustor 4. A part of the first supply pipe 61 is connected to the heat exchanger 5. The air in the first supply pipe 61 flows through the low temperature side flow path 51 of the heat exchanger 5.

The second supply pipe 62 connects the outlet 31b of the second compressor 31 to the second intake port 42 of the combustor 4. The second supply pipe 62 allows air compressed by the second compressor 31 to flow toward the combustor 4. Part of the second supply pipe 62 is connected to the heat exchanger 5. The air in the second supply pipe 62 flows through the low temperature side flow path 51 of the heat exchanger 5. The first supply pipe 61 and the second supply pipe 62 are formed independently without mixing the internal air with each other. That is, in the heat exchanger 5, the low temperature side flow path 51 through which the air in the first supply pipe 61 flows and the low temperature side flow path 51 through which the air in the second supply pipe 62 flows are distinguished from each other.

The compressor communication pipe 63 allows the outlet 21b of the first compressor 21 and the inlet 31a of the second compressor 31 to communicate with each other. The compressor communication pipe 63 allows the air compressed by the first compressor 21 to flow toward the second compressor 31.

The first outlet pipe 64 connects the first exhaust port 43 of the combustor 4 to the inlet 22a of the first turbine 22. The first outlet pipe 64 allows the combustion gas discharged from the combustor 4 to flow toward the first turbine 22. When the combustion gas flows into the first turbine 22, the first turbine 22 rotates.

The second outlet pipe 65 connects the second exhaust port 44 of the combustor 4 to the inlet 32a of the second turbine 32. The second outlet pipe 65 allows the combustion gas discharged from the combustor 4 to flow toward the second turbine 32. When the combustion gas flows into the second turbine 32, the second turbine 32 rotates.

The first discharge pipe 66 is connected to the outlet 22b of the first turbine 22. The first discharge pipe 66 discharges the high-temperature fluid (combustion gas) discharged from the first turbine 22 to the outside of the airframe. Part of the first discharge pipe 66 is connected to the heat exchanger 5. The air in the first discharge pipe 66 flows through the high temperature side flow path 52 of the heat exchanger 5.

The second discharge pipe 67 is connected to the outlet 32b of the second turbine 32. The second discharge pipe 67 discharges the high-temperature fluid discharged from the second turbine 32 to the outside of the airframe. Part of the second discharge pipe 67 is connected to the heat exchanger 5. The air in the second discharge pipe 67 flows through the high temperature side flow path 52 of the heat exchanger 5. The first discharge pipe 66 and the second discharge pipe 67 are formed independently without mixing the internal air with each other. That is, in the heat exchanger 5, the high temperature side flow path 52 through which the air in the first discharge pipe 66 flows and the high temperature side flow path 52 through which the air in the second discharge pipe 67 flows are distinguished from each other.

The turbine communication pipe 68 allows the inlet 22a of the first turbine 22 to communicate with the outlet 32b of the second turbine 32. The turbine communication pipe 68 allows the air discharged from the second turbine 32 to flow toward the first turbine 22. In this embodiment, the upstream end portion of the turbine communication pipe 68 in the combustion gas flow direction is connected to a middle portion 59 of the second discharge pipe 67. The middle portion 59 of the second discharge pipe 67 is provided on the upstream side of the heat exchanger 5. That is, the second discharge pipe 67 is bifurcated at the middle portion 59. The downstream end portion of the turbine communication pipe 68 in the combustion gas flow direction is connected to a middle portion 58 of the first outlet pipe 64.

(On-Off Valves)

The plurality of on-off valves 7 include a first on-off valve 71, a second on-off valve 72, a third on-off valve 73, a fourth on-off valve 74, and a fifth on-off valve 75. Each on-off valve is, for example, a solenoid valve that opens and closes the valve by switching on and off energization. In each drawing, the on-off valve 7 painted in white indicates that the on-off valve 7 is opened. The on-off valve 7 painted in black indicates that the on-off valve 7 is closed.

The first on-off valve 71 is provided in the first supply pipe 61. The first on-off valve 71 can be switched to enable or disable the flow of air in the first supply pipe 61.

The second on-off valve 72 is provided on the upstream side of the inlet 31a of the second compressor 31 in the air flow direction. The second on-off valve 72 can be switched to enable or disable the flow of air in the second compressor 31.

The third on-off valve 73 is provided in the compressor communication pipe 63. The third on-off valve 73 can be switched to enable or disable the flow of air in the compressor communication pipe 63.

The fourth on-off valve 74 is provided in the connection portion (the middle portion 59 of the second discharge pipe 67) between the second discharge pipe 67 and the turbine communication pipe 68. The fourth on-off valve 74 can be switched to enable or disable the flow of fluid from the second discharge pipe 67 into the turbine communication pipe 68. The fourth on-off valve 74 is a three-way valve including an inflow valve 74a, a first outflow valve 74b, and a second outflow valve 74c. The inflow valve 74a is provided on the upstream side of the middle portion 59 in the second discharge pipe 67. The inflow valve 74a enables or disables the flow of the combustion gas discharged from the second turbine 32 into the middle portion 59. The first outflow valve 74b is provided on the downstream side of the middle portion 59 in the second discharge pipe 67. The first outflow valve 74b enables or disables the flow of the combustion gas flowing into the middle portion 59 to the downstream side of the second discharge pipe 67. The second outflow valve 74c is provided at the upstream end portion of the turbine communication pipe 68. The second outflow valve 74c enables or disables the flow of the combustion gas flowing into the middle portion 59 into the turbine communication pipe 68.

The fifth on-off valve 75 is provided in the connection portion (the middle portion 58 of the first outlet pipe 64) between the first outlet pipe 64 and the turbine communication pipe 68. The fifth on-off valve 75 can be switched to enable or disable the flow of fluid from the turbine communication pipe 68 toward the first turbine 22 through the first outlet pipe 64. The fifth on-off valve 75 is a three-way valve including a first inflow valve 75a, a second inflow valve 75b, and an outflow valve 75c. The first inflow valve 75a is provided on the upstream side of the middle portion 58 in the first outlet pipe 64. The first inflow valve 75a enables or disables the flow of the combustion gas discharged from the combustor 4 into the middle portion 58. The second inflow valve 75b is provided at the downstream end portion of the turbine communication pipe 68. The second inflow valve 75b enables or disables the flow of the combustion gas flowing in the turbine communication pipe 68 into the middle portion 58. The outflow valve 75c is provided on the downstream side of the middle portion 58 in the first outlet pipe 64. The outflow valve 75c enables or disables the flow of the combustion gas flowing into the middle portion 58 into the first turbine 22.

Each of the plurality of on-off valves 7 is controlled to be openable and closable by a control unit (not shown). The control unit transmits a signal to each on-off valve by, for example, an electric method. Each of the plurality of on-off valves 7 can be switched to an open state or a closed state by the received signal. The control unit specifies that the aircraft is in a predetermined operation mode based on the state information of the aircraft and the operation information from the pilot and opens and closes each on-off valve in a predetermined combination according to the type of the specified operation mode. In this embodiment, the control unit can specify at least two operation modes of a large output operation mode M1 and a small output operation mode M2.

(Operation of Gas Turbine System in Each Operation Mode)

Next, an operation of the gas turbine system 1 in each operation mode will be described.

First, the operation of the gas turbine system 1 in the large output operation mode M1 will be described with reference to FIG. 2. The large output operation mode M1 is an operation mode in which the required output for the first gas turbine element 2 and the second gas turbine element 3 is larger than a predetermined value. The required output is the electric power required for the aircraft to shift to or maintain the flight state according to the control signal. The large output operation mode M1 is an operation mode corresponding to a high load.

As shown in FIG. 2, the control unit shifts the gas turbine system 1 to the large output operation mode M1, for example, when the aircraft is in a take-off/landing state. In the large output operation mode M1, the control unit opens the first on-off valve 71 and the second on-off valve 72 and closes the third on-off valve 73. That is, the control unit allows air to flow from each of the first compressor 21 and the second compressor 31 to the combustor 4 and interrupts the flow of the air from the first compressor 21 to the second compressor 31. Further, the control unit opens the inflow valve 74a and the first outflow valve 74b of the fourth on-off valve 74 and closes the second outflow valve 74c. In other words, the opening and closing of the fourth on-off valve 74 is controlled so that the flow of the fluid toward the turbine communication pipe 68 is interrupted and the fluid flows through the second discharge pipe 67. Further, in the large output operation mode M1, the control unit opens the first inflow valve 75a and the outflow valve 75c of the fifth on-off valve 75 and closes the second inflow valve 75b. In other words, the opening and closing of the fifth on-off valve 75 is controlled so that the flow of the fluid from the turbine communication pipe 68 toward the first outlet pipe 64 is interrupted and the fluid flows through the first outlet pipe 64.

The first compressor 21 sucks and compresses external air. The air compressed by the first compressor 21 flows through the first supply pipe 61 and the low temperature side flow path 51 of the heat exchanger 5 and flows into the combustor 4. Similarly, the second compressor 31 sucks and compresses external air. The air compressed by the second compressor 31 flows through the second supply pipe 62 and the low temperature side flow path 51 of the heat exchanger 5 and flows into the combustor 4. Accordingly, since the compressed air flows from each of the first compressor 21 and the second compressor 31 into the combustor 4, a sufficient flow rate of air for generating a required output is supplied to the combustor 4. At this time, the air heated as compared with the external air flows into the combustor 4 by receiving thermal energy in the heat exchanger 5.

About half of the combustion gas discharged from the combustor 4 flows through the first outlet pipe 64 to be supplied to the first turbine 22 and to rotate the first turbine 22. Then, the combustion gas flows through the first discharge pipe 66 and is discharged from the first turbine 22 to the outside. A high-temperature combustion gas (high-temperature fluid) flowing through the first discharge pipe 66 flows through the high temperature side flow path 52 of the heat exchanger 5 before being discharged to the outside and is discharged to the outside after passing the thermal energy through the heat exchanger 5.

The other half of the combustion gas discharged from the combustor 4 flows through the second outlet pipe 65 to be supplied to the second turbine 32 and to rotate the second turbine 32. Then, the combustion gas flows through the second discharge pipe 67 and is discharged from the second turbine 32 to the outside. The high-temperature combustion gas (high-temperature fluid) flowing through the second discharge pipe 67 flows through the high temperature side flow path 52 of the heat exchanger 5 before being discharged to the outside and is discharged to the outside after passing the thermal energy through the heat exchanger 5.

Figure 4:
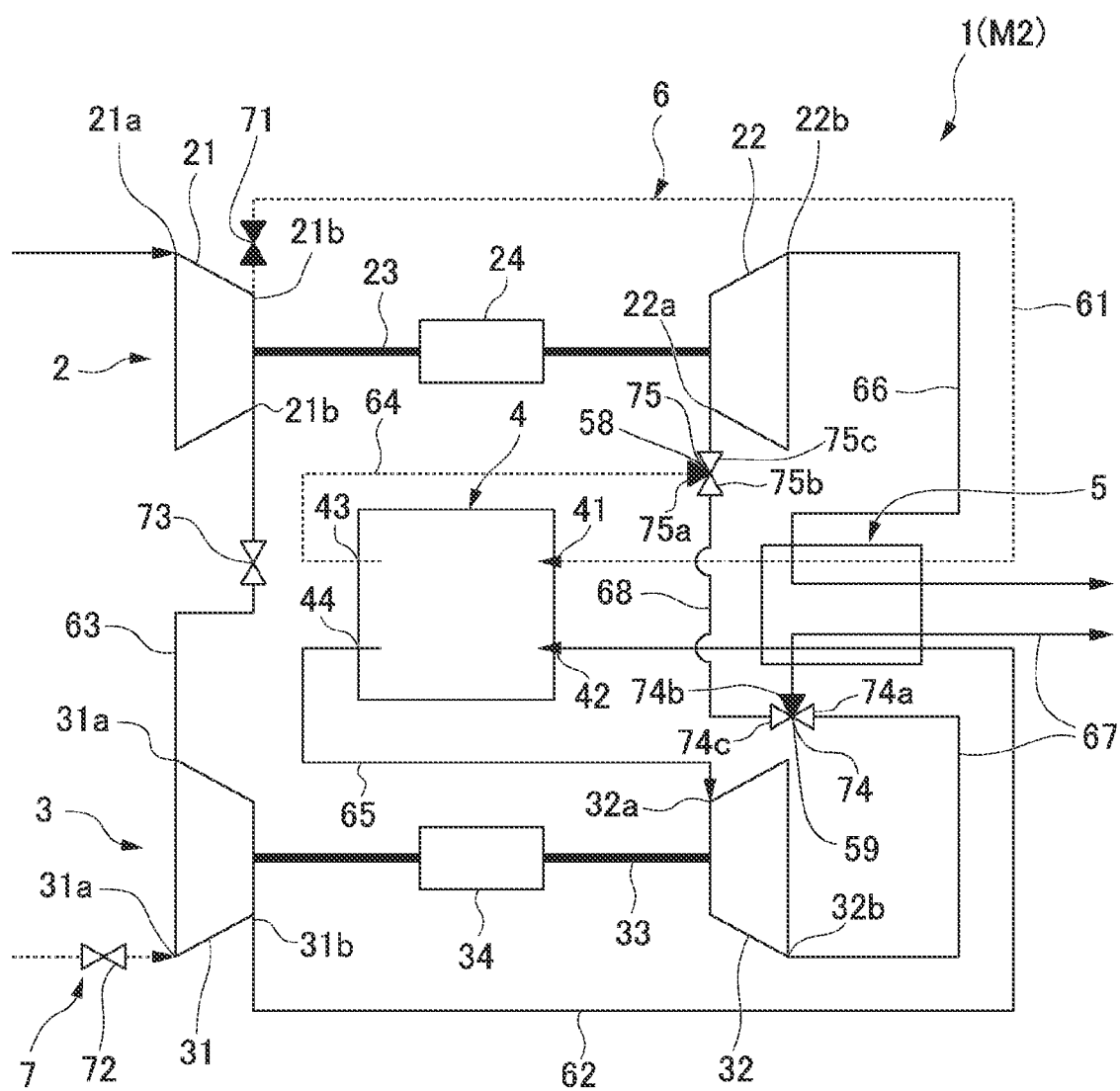
FIG. 4 is a schematic configuration diagram of the gas turbine system (small output operation mode) according to the first embodiment.

Next, the operation of the gas turbine system 1 in the small output operation mode M2 will be described with reference to FIG. 4. FIG. 4 is a schematic configuration diagram of the gas turbine system 1 (small output operation mode M2) according to the first embodiment. The small output operation mode M2 is an operation mode in which the required output for the first gas turbine element 2 and the second gas turbine element 3 is smaller than a predetermined value. The small output operation mode M2 is an operation mode of which an output is smaller than that of the large output operation mode M1. The small output operation mode M2 is an operation mode corresponding to a low load.

As shown in FIG. 4, the control unit shifts the gas turbine system 1 to the small output operation mode M2, for example, when the aircraft is cruising. In the small output operation mode M2, the control unit closes the first on-off valve 71 and the second on-off valve 72 and opens the third on-off valve 73. That is, the control unit interrupts the flow of the air from the first compressor 21 to the combustor 4 and allows the air to flow from the first compressor 21 to the second compressor 31. Further, the control unit opens the inflow valve 74a and the second outflow valve 74c of the fourth on-off valve 74 and closes the first outflow valve 74b. In other words, the opening and closing of the fourth on-off valve 74 is controlled so that the fluid flows from the second discharge pipe 67 toward the turbine communication pipe 68 and the discharge of the fluid from the second discharge pipe 67 to the outside is interrupted. Further, in the small output operation mode M2, the control unit opens the second inflow valve 75b and the outflow valve 75c of the fifth on-off valve 75 and closes the first inflow valve 75a. In other words, the opening and closing of the fifth on-off valve 75 is controlled so that the fluid flows from the turbine communication pipe 68 toward the first outlet pipe 64 and the flow of the fluid from the combustor 4 toward the first turbine 22 in the first outlet pipe 64 is interrupted.

The first compressor 21 sucks and compresses external air. The air compressed by the first compressor 21 flows through the compressor communication pipe 63 and flows into the second compressor 31. Since the second on-off valve 72 is closed, only the compressed air is supplied from the first compressor 21 to the second compressor 31. The second compressor 31 further compresses the compressed air from the first compressor 21. The air which is compressed in multiple stages by the first compressor 21 and the second compressor 31 flows through the second supply pipe 62 and the low temperature side flow path 51 of the heat exchanger 5 and flows into the combustor 4. In this way, since the air sequentially passing through the first compressor 21 and the second compressor 31 is compressed in multiple stages, the compressed air having a pressure higher than that of the compressed air of the large output operation mode M1 is supplied to the combustor 4.

Since the first inflow valve 75a of the fifth on-off valve 75 is closed, the combustion gas discharged from the combustor 4 is discharged only from the second exhaust port 44. The combustion gas discharged from the combustor 4 flows through the second discharge pipe 67 to be supplied to the second turbine 32 and to rotate the second turbine 32. The combustion gas discharged from the outlet 32b of the second turbine 32 flows into the turbine communication pipe 68 through the second discharge pipe 67 and the fourth on-off valve 74 on the upstream side of the fourth on-off valve 74. Further, after the combustion gas flows through the turbine communication pipe 68, the combustion gas is supplied to the inlet 22a of the first turbine 22 through the fifth on-off valve 75 and the first outlet pipe 64 on the downstream side of the fifth on-off valve 75 to rotate the first turbine 22. Then, the combustion gas flows through the first discharge pipe 66 and is discharged from the first turbine 22 to the outside. In the small output operation mode M2, heat is exchanged between the low-temperature fluid (air) flowing through the second supply pipe 62 and the high-temperature fluid (combustion gas) flowing through the first discharge pipe 66.

(Operation and Effect)

Next, the operation and effect of the gas turbine system 1 will be described.

According to the gas turbine system 1 of this embodiment, the gas turbine system 1 includes two gas turbine elements 2 and 3 and the single combustor 4. Accordingly, it is possible to decrease the number of components and decrease the weight of the entire gas turbine system 1 as compared with the case in which the plurality of combustors 4 are provided. Since the weight of the gas turbine system 1 is decreased, it is possible to improve the fuel efficiency of the gas turbine system 1 by suppressing fuel consumption.

The gas turbine system 1 includes the heat exchanger 5. Each of the low-temperature fluid (air) flowing through the first supply pipe 61 and the second supply pipe 62 and the high-temperature fluid (combustion gas) flowing through the first discharge pipe 66 and the second discharge pipe 67 flows through the heat exchanger 5. Since these fluids flow through the heat exchanger 5, heat is exchanged between the low-temperature fluid and the high-temperature fluid. Accordingly, the air to flow into the combustor 4 can be heated by using the heat of the high-temperature fluid discharged after combustion. Since the heated air is burned, the thermal efficiency of the combustor 4 can be improved compared with the related art that burns cool air sucked from the external air. Furthermore, the heat of the high-temperature fluid, which was conventionally discarded as an exhaust gas, can be effectively used. Thus, the energy efficiency related to combustion can be improved and the fuel efficiency of the gas turbine system 1 can be improved.

The pipes 6 of the gas turbine system 1 are respectively provided with the first to third on-off valves 71, 72, and 73. By opening and closing these on-off valves, it is possible to change the flow path of the fluid and to change the magnitude of the output or the combustion efficiency of the gas turbine system 1. Accordingly, the gas turbine system 1 can be used in the optimum state in each of the plurality of operation modes, for example, at a high load state when the aircraft is in a take-off/landing state or the like and a low load state when the aircraft is in a cruising state or the like. Thus, the fuel efficiency of the gas turbine system 1 can be improved compared with the related art.

Thus, it is possible to provide the gas turbine system 1 having fuel efficiency improved compared with the related art.

The fourth on-off valve 74 is a three-way valve provided in the connection portion (middle portion 59) between the second discharge pipe 67 and the turbine communication pipe 68. The fifth on-off valve 75 is a three-way valve provided in the connection portion (middle portion 58) between the first outlet pipe 64 and the turbine communication pipe 68. The gas turbine system 1 can be switched between the large output operation mode M1 in which the required output is larger than the predetermined value and the small output operation mode M2 in which the required output is smaller than the predetermined value. In the large output operation mode M1 corresponding to the high load, the first on-off valve 71 and the second on-off valve 72 are opened and the third on-off valve 73 is closed. The fourth on-off valve 74 is opened and closed so that the flow of the fluid toward the turbine communication pipe 68 is interrupted and the fluid flows through the second discharge pipe 67. The fifth on-off valve 75 is opened and closed so that the flow of the fluid from the turbine communication pipe 68 toward the first outlet pipe 64 is interrupted and the fluid flows through the first outlet pipe 64. Accordingly, the air flowing into the first compressor 21 is discharged while sequentially flowing through the heat exchanger 5, the combustor 4, the first turbine 22, and the heat exchanger 5. Similarly, the air flowing into the second compressor 31 is discharged while sequentially flowing through the heat exchanger 5, the combustor 4, the second turbine 32, and the heat exchanger 5. In this way, in the large output operation mode M1, the air compressed by each of the compressors 21 and 31 flows into the single combustor 4. Thus, since the amount of the air flowing into the combustor 4 increases, a high output can be obtained from the gas turbine system 1. Thus, it is possible to perform a suitable operation mode particularly at a high load state when the aircraft is in a take-off/landing state or the like.

In the small output operation mode M2 corresponding to the low load, the first on-off valve 71 and the second on-off valve 72 are closed and the third on-off valve 73 is opened. The fourth on-off valve 74 is opened and closed so that the fluid flows from the second discharge pipe 67 toward the turbine communication pipe 68 and the discharge of the fluid from the second discharge pipe 67 to the outside is interrupted. The fifth on-off valve 75 is opened and closed so that the fluid flows from the turbine communication pipe 68 toward the first outlet pipe 64 and the flow of the fluid from the combustor 4 toward the first turbine 22 in the first outlet pipe 64 is interrupted. Accordingly, the air flowing into the first compressor 21 is discharged while sequentially flowing through the second compressor 31, the heat exchanger 5, the combustor 4, the second turbine 32, the first turbine 22, and the heat exchanger 5. The air is compressed in multiple stages by the first compressor 21 and the second compressor 31 and is supplied to the combustor 4. In this way, since the air having a pressure increased by the multi-stage compression is supplied to the combustor 4 in the small output operation mode M2, the energy efficiency can be increased by improving the engine cycle. Thus, it is possible to realize low fuel consumption of the gas turbine system 1 at the low load state. Thus, the fuel efficiency of the gas turbine system 1 particularly at a low load can be improved compared with the related art.

By opening and closing each of the first to fifth on-off valves 7, the above-described modes can be easily switched. Accordingly, it is possible to optimize the operation of the gas turbine system 1 in response to the required output (the magnitude of the load) while suppressing an excessive increase in weight. Thus, the fuel efficiency of the gas turbine system 1 can be improved.

The first generator 24 is provided between the first compressor 21 and the first turbine 22 in the axial direction of the first rotation shaft 23. The second generator 34 is provided between the second compressor 31 and the second turbine 32 in the axial direction of the second rotation shaft 33. In this way, since the generators 24 and 34 are respectively disposed between the compressors 21 and 31 and the turbines 22 and 32, it is possible to shorten the axial length of the entire gas turbine element by effectively using the space between the compressors 21 and 31 and the turbines 22 and 32 in the axial direction. Thus, it is possible to decrease the weight of a gas turbine system 201 by suppressing an increase in size of the gas turbine system 201. Thus, it is possible to improve the fuel efficiency of the gas turbine system 201.

Second Embodiment

Figure 5:
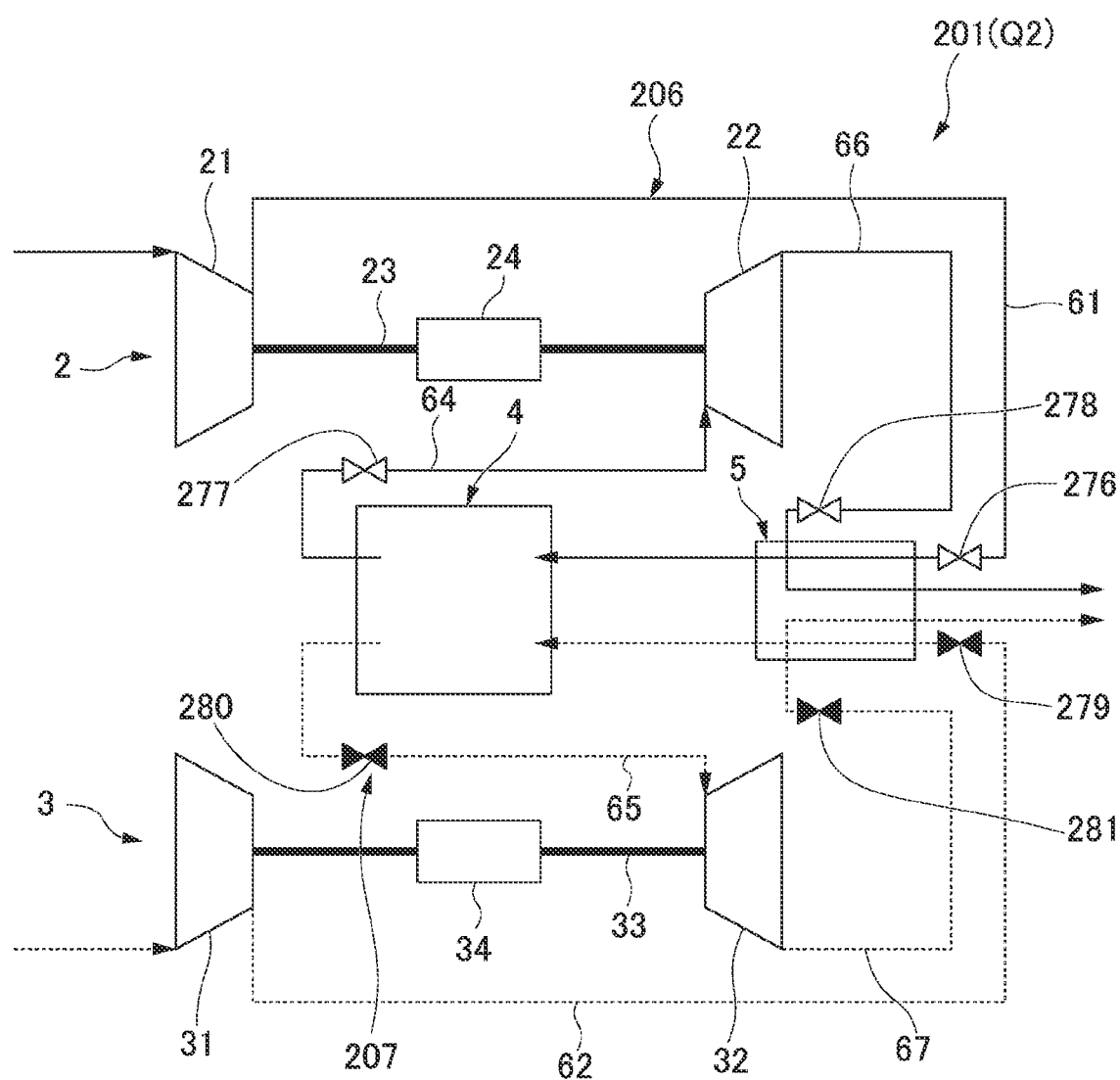
FIG. 5 is a schematic configuration diagram of a gas turbine system according to a second embodiment.

Next, a second embodiment of the present invention will be described. FIG. 5 is a schematic configuration diagram of the gas turbine system 201 according to the second embodiment. Specifically, FIG. 5 shows the operation of the gas turbine system 201 in a second operation mode Q2 of two operation modes to be described later. In the following description, the same configuration as that of the first embodiment will be indicated by the same reference numeral and the description will be appropriately omitted. In this embodiment, the configurations of the pipe 6 and the on-off valve 7 are different from those of the first embodiment.

In the second embodiment, a plurality of pipes 206 include the first supply pipe 61, the second supply pipe 62, the first outlet pipe 64, the second outlet pipe 65, the first discharge pipe 66, and the second discharge pipe 67. The configurations of the first supply pipe 61, the second supply pipe 62, the first outlet pipe 64, the second outlet pipe 65, the first discharge pipe 66, and the second discharge pipe 67 of the second embodiment are the same as those of the first embodiment. In other words, the second embodiment has a configuration in which the compressor communication pipe 63 and the turbine communication pipe 68 (see FIG. 2) of the first embodiment are omitted.

In the second embodiment, a plurality of on-off valves 207 include a sixth on-off valve 276, a seventh on-off valve 277, an eighth on-off valve 278, a ninth on-off valve 279, a tenth on-off valve 280, and an eleventh on-off valve 281.

The sixth on-off valve 276 is provided in the first supply pipe 61. The sixth on-off valve 276 is provided on the upstream side of the heat exchanger 5. The sixth on-off valve 276 can be switched to enable or disable the flow of air in the first supply pipe 61.

The seventh on-off valve 277 is provided in the first outlet pipe 64. The seventh on-off valve 277 can be switched to enable or disable the flow of air in the first outlet pipe 64.

The eighth on-off valve 278 is provided in the first discharge pipe 66. The eighth on-off valve 278 is provided on the upstream side of the heat exchanger 5. The eighth on-off valve 278 can be switched to enable or disable the flow of air in the first discharge pipe 66.

The ninth on-off valve 279 is provided in the second supply pipe 62. The ninth on-off valve 279 is provided on the upstream side of the heat exchanger 5. The ninth on-off valve 279 can be switched to enable or disable the flow of air in the second supply pipe 62.

The tenth on-off valve 280 is provided in the second outlet pipe 65. The tenth on-off valve 280 can be switched to enable or disable the flow of air in the second outlet pipe 65.

The eleventh on-off valve 281 is provided in the second discharge pipe 67.

The eleventh on-off valve 281 is provided on the upstream side of the heat exchanger 5. The eleventh on-off valve 281 can be switched to enable or disable the flow of air in the second discharge pipe 67.

Since the control unit controls the opening and closing of the plurality of on-off valves 207, the gas turbine system 201 can be switched between at least two operation modes of the first operation mode Q1 corresponding to the high load state and the second operation mode Q2 (see FIG. 5) corresponding to the low load state. In this embodiment, the first operation mode Q1 is an operation mode in which both of two gas turbine elements 2 and 3 are operated and the second operation mode Q2 is an operation mode in which one gas turbine element of two gas turbine elements 2 and 3 is stopped.

(Operation of Gas Turbine System in Each Operation Mode)

Next, the operation of the gas turbine system 201 in each operation mode will be described. First, the operation of the gas turbine system 201 in the first operation mode Q1 will be described. The first operation mode Q1 is an operation mode in which an output value is larger than a predetermined value.

In the first operation mode Q1, the control unit opens the sixth on-off valve 276, the seventh on-off valve 277, the eighth on-off valve 278, the ninth on-off valve 279, the tenth on-off valve 280, and the eleventh on-off valve 281. That is, the fluid (air or combustion gas) can flow through all pipes of the first supply pipe 61, the second supply pipe 62, the first outlet pipe 64, the second outlet pipe 65, the first discharge pipe 66, and the second discharge pipe 67.

The first compressor 21 sucks and compresses external air. The air compressed by the first compressor 21 flows through the first supply pipe 61 and the low temperature side flow path 51 of the heat exchanger 5 and flows into the combustor 4. The second compressor 31 sucks and compresses external air. The air compressed by the second compressor 31 flows through the second supply pipe 62 and the low temperature side flow path 51 of the heat exchanger 5 and flows into the combustor 4. Accordingly, since the compressed air flows from each of the first compressor 21 and the second compressor 31 into the combustor 4, a sufficient flow rate of air for generating a required output is supplied to the combustor 4.

About half of the combustion gas discharged from the combustor 4 flows through the first outlet pipe 64 to be supplied to the first turbine 22 and to rotate the first turbine 22. Then, the combustion gas flows through the first discharge pipe 66 and the high temperature side flow path 52 of the heat exchanger 5 and is discharged from the first turbine 22 to the outside. The other half of the combustion gas discharged from the combustor 4 flows through the second outlet pipe 65 to be supplied to the second turbine 32 and to rotate the second turbine 32. Then, the combustion gas flows through the second discharge pipe 67 and the high temperature side flow path 52 of the heat exchanger 5 and is discharged from the second turbine 32 to the outside. Since the first turbine 22 and the second turbine 32 rotate, the first generator 24 and the second generator 34 are rotationally driven to generate electric power.

At this time, in the heat exchanger 5, similarly to the first embodiment, heat is exchanged between the low-temperature fluid (air) in the first supply pipe 61 and the second supply pipe 62 and the high-temperature fluid (combustion gas) in the first discharge pipe 66 and the second discharge pipe 67.

Next, the operation of the gas turbine system 201 in the second operation mode Q2 will be described. The second operation mode Q2 is an operation mode in which the output value is smaller than a predetermined value.

As shown in FIG. 5, in the second operation mode Q2, the control unit stops the operation of one of the first gas turbine element 2 and the second gas turbine element 3 and closes the on-off valve 207 provided in the supply pipe, the outlet pipe, and the discharge pipe connected to the stopped gas turbine element. In the example shown in FIG. 5, a case of stopping the operation of the second gas turbine element 3 will be described. In the example shown in FIG. 5, the control unit closes the on-off valve 207 provided in the second supply pipe 62, the second outlet pipe 65, and the second discharge pipe 67 connected to the stopped second gas turbine element 3. Specifically, the control unit opens the sixth on-off valve 276, the seventh on-off valve 277, and the eighth on-off valve 278 and closes the ninth on-off valve 279, the tenth on-off valve 280, and the eleventh on-off valve 281. Accordingly, the control unit stops the operation of the second gas turbine element 3 and operates the first gas turbine element 2.

In the second operation mode Q2, the first compressor 21 sucks and compresses external air. The air compressed by the first compressor 21 flows through the first supply pipe 61 and the low temperature side flow path 51 of the heat exchanger 5 and flows into the combustor 4. The combustion gas discharged from the combustor 4 flows through the first outlet pipe 64 to be supplied to the first turbine 22 and to rotate the first turbine 22. Then, the combustion gas flows through the first discharge pipe 66 and the high temperature side flow path 52 of the heat exchanger 5 and is discharged from the first turbine 22 to the outside.

At this time, in the heat exchanger 5, heat is exchanged between the low-temperature fluid (air) in the first supply pipe 61 and the high-temperature fluid (combustion gas) in the first discharge pipe 66.

According to the second embodiment, the gas turbine system 201 includes two gas turbine elements 2 and 3, the single combustor 4, and the heat exchanger 5. Thus, it is possible to obtain the same operation and effect as that of the first embodiment.

Thus, it is possible to provide the gas turbine system 201 having fuel efficiency improved compared with the related art.

The sixth on-off valve 276 is provided in the first supply pipe 61. The seventh on-off valve 277 is provided in the first outlet pipe 64. The eighth on-off valve 278 is provided in the first discharge pipe 66. The ninth on-off valve 279 is provided in the second supply pipe 62. The tenth on-off valve 280 is provided in the second outlet pipe 65. The eleventh on-off valve 281 is provided in the second discharge pipe 67. By opening and closing these on-off valves 207, it is possible to change the flow path of the fluid and to change the magnitude of the output or the combustion efficiency of the gas turbine system 201. Accordingly, the gas turbine system 1 can be used in the optimum state in each of the plurality of operation modes, for example, at a high load state when the aircraft is in a take-off/landing state and a low load state when the aircraft is in a cruising state. Thus, the fuel efficiency of the gas turbine system 1 can be improved compared with the related art.

In the second operation mode Q2 corresponding to the low load state, one gas turbine element (in this embodiment, the second gas turbine element 3) of two gas turbine elements is stopped. At this time, the on-off valves 279, 280, and 281 provided in the pipes 206 (the second supply pipe 62, the second outlet pipe 65, and the second discharge pipe 67) connected to the stopped second gas turbine element 3 are closed. Accordingly, the other first gas turbine element 2 can be operated while stopping the operation of one second gas turbine element 3. At this time, the flow of air between the stopped second gas turbine element 3 and the combustor 4 and between the stopped second gas turbine element 3 and the operating first gas turbine element 2 is interrupted by the on-off valves 279, 280, and 281. Therefore, the air flowing through the operating first gas turbine element 2 does not flow out toward the stopped second gas turbine element 3. Thus, it is possible to suppress the generation of excessive electric power at the low load state by stably operating only one gas turbine element. Thus, it is possible to further improve the fuel efficiency of the gas turbine system 1 in addition to improving the thermal efficiency of the heat exchanger 5.

Third Embodiment

Figure 6:
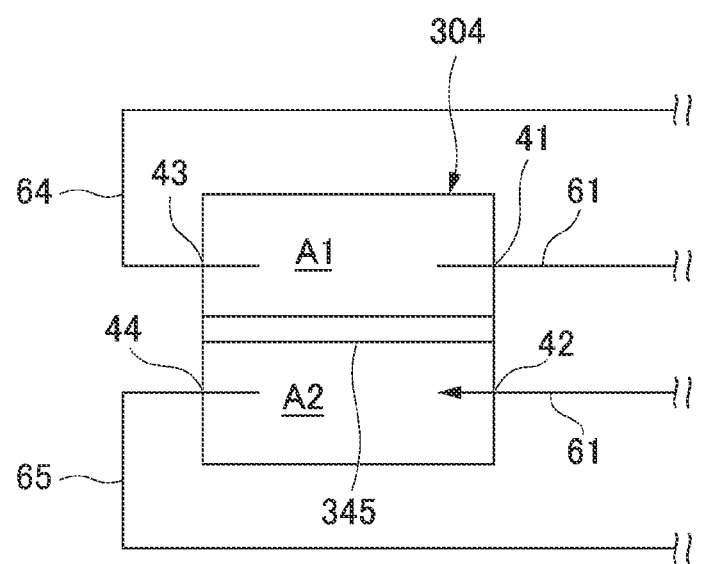
FIG. 6 is a schematic cross-sectional view of a combustor according to a third embodiment.

Next, a third embodiment according to the present invention will be described. FIG. 6 is a schematic cross-sectional view of a combustor 304 according to the third embodiment. In the following description, the same configuration as those of the first embodiment and the second embodiment will be indicated by the same reference numeral and the description will be appropriately omitted. This embodiment is different from each of the above-described embodiments in that the combustor 304 includes a shielding wall 345.

In the third embodiment, the combustor 304 includes the shielding wall 345 provided therein. The shielding wall 345 divides a space in the combustor 304 into a first space A1 communicating with the first intake port 41 and the first exhaust port 43 of the combustor 304 and a second space A2 communicating with the second intake port 42 and the second exhaust port 44. The shielding wall 345 is, for example, a plate member provided separately from the combustor 304.

According to the third embodiment, for example, when one gas turbine element of two gas turbine elements is stopped (in the application case to the second embodiment), the flow of the high-temperature air from the combustor 304 into the stopped gas turbine element is suppressed. Thus, it is possible to suppress a component such as the on-off valve 207 provided in the stopped gas turbine element from being damaged by heat.

When both of two gas turbine elements are operated (in the application case to the first embodiment), a uniform flow rate of fluid (combustion gas) can be supplied to both of two turbines 22 and 32 by the shielding wall 345. Thus, the energy efficiency of the gas turbine element is improved and hence the fuel efficiency of the gas turbine system 1 can be improved.

Since the shielding wall 345 is formed separately from the combustor 304, the shielding wall 345 can have a simple configuration. Thus, an increase in weight of the combustor 304 can be suppressed as compared with the case in which the plurality of combustors 304 are provided.

Additionally, the technical scope of the present invention is not limited to the above-described embodiments and various modifications can be made in the scope not departing from the spirit of the present invention.

For example, in the first embodiment, the heat exchanger 5 may include a single low temperature side flow path 51 through which the fluid flowing through the first gas turbine element 2 and the fluid flowing through the second gas turbine element 3 flow. That is, in the heat exchanger 5, the low temperature side flow path 51 through which the air in the first supply pipe 61 flows and the low temperature side flow path 51 through which the air in the second supply pipe 62 flows may have the same configuration. Similarly, the heat exchanger 5 may include a single high temperature side flow path 52 through which the fluid flowing through the first gas turbine element 2 and the fluid flowing through the second gas turbine element 3 flow. That is, in the heat exchanger 5, the high temperature side flow path 52 through which the air in the first discharge pipe 66 flows and the high temperature side flow path 52 through which the air in the second discharge pipe 67 flows may have the same configuration.

In the second embodiment, a configuration of stopping the second gas turbine element 3 has been described, but the present invention is not limited thereto. In the second operation mode Q2, the first gas turbine element 2 may be stopped and the second gas turbine element 3 may be operated. In this case, the control unit closes the sixth on-off valve 276, the seventh on-off valve 277, and the eighth on-off valve 278 and opens the ninth on-off valve 279, the tenth on-off valve 280, and the eleventh on-off valve 281.

The gas turbine system 1 may include three or more gas turbine elements. In this case, in the second operation mode Q2, for example, any one or more gas turbine elements of the plurality of gas turbine elements may be stopped.

The shielding wall 345 may be provided with, for example, a hole or a gap allowing the first space A1 and the second space A2 to communicate with each other. In this case, the first space A1 and the second space A2 can have a uniform pressure.

The shielding wall 345 may be detachably attached to the combustor 4 at the time of manufacture.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES 1, 201 Gas turbine system
2 First gas turbine element
3 Second gas turbine element
4, 304 Combustor
5 Heat exchanger
21 First compressor
21b Outlet (of first compressor)
22 First turbine
23 First rotation shaft
24 First generator 31 Second compressor
31a Inlet (of second compressor)
32 Second turbine
33 Second rotation shaft
34 Second generator
41 First intake port (intake port)
42 Second intake port (intake port)
43 First exhaust port
44 Second exhaust port
58 Middle portion (connection portion) (of first outlet pipe)
59 Middle portion (connection portion) (of second discharge pipe)
61 First supply pipe
62 Second supply pipe
63 Compressor communication pipe
64 First outlet pipe
65 Second outlet pipe
66 First discharge pipe
67 Second discharge pipe
68 Turbine communication pipe
71 First on-off valve
72 Second on-off valve
73 Third on-off valve
74 Fourth on-off valve
75 Fifth on-off valve
276 Sixth on-off valve
277 Seventh on-off valve
278 Eighth on-off valve
279 Ninth on-off valve
280 Tenth on-off valve
281 Eleventh on-off valve
M1 Large output operation mode
M2 Small output operation mode
Q1 First operation mode
Q2 Second operation mode

What is claimed is:

1. A gas turbine system comprising:
a first gas turbine element which includes a first compressor and a first turbine rotating together with the first compressor;
a second gas turbine element which includes a second compressor and a second turbine rotating together with the second compressor;
a single combustor which is connected to each of the first gas turbine element and the second gas turbine element;
a first supply pipe which connects the first compressor to the combustor and allows air compressed by the first compressor to flow toward an intake port of the combustor;
a second supply pipe which connects the second compressor to the combustor and allows air compressed by the second compressor to flow toward the intake port of the combustor;
a compressor communication pipe which allows an outlet of the first compressor to communicate with an inlet of the second compressor;
a first discharge pipe which discharges a fluid discharged from the combustor and flowing into the first turbine to the outside;
a second discharge pipe which discharges the fluid discharged from the combustor and flowing into the second turbine to the outside;
a heat exchanger which allows each of a low-temperature fluid flowing through the first supply pipe and the second supply pipe and a high-temperature fluid flowing through the first discharge pipe and the second discharge pipe to flow therethrough and exchanges heat between the low-temperature fluid and the high-temperature fluid;
a first on-off valve which is provided in the first supply pipe and is able to interrupt the flow of air in the first supply pipe;
a second on-off valve which is provided on the upstream side of the inlet of the second compressor in an air flow direction and is able to interrupt the flow of air into the second compressor; and
a third on-off valve which is provided in the compressor communication pipe and is able to interrupt the flow of air in the compressor communication pipe.

2. The gas turbine system according to claim 1, further comprising:
a first outlet pipe which connects the combustor to the first turbine and allows the fluid discharged from the combustor to flow toward the first turbine;
a second outlet pipe which connects the combustor to the second turbine and allows the fluid discharged from the combustor to flow toward the second turbine;
a turbine communication pipe which allows the second discharge pipe to communicate with the first outlet pipe;
a fourth on-off valve which is provided in a connection portion between the second discharge pipe and the turbine communication pipe and is able to interrupt the flow of the fluid into the turbine communication pipe; and
a fifth on-off valve which is provided in a connection portion between the first outlet pipe and the turbine communication pipe and is able to interrupt the flow of the fluid from the turbine communication pipe toward the first turbine,
wherein the fourth on-off valve and the fifth on-off valve are three-way valves, and
wherein in a large output operation mode in which a required output for the first gas turbine element and the second gas turbine element is larger than a predetermined value, an operation of opening the first on-off valve and the second on-off valve and closing the third on-off valve is performed, the fourth on-off valve is opened and closed so that the flow of the fluid toward the turbine communication pipe is interrupted and the fluid flows through the second discharge pipe, and the fifth on-off valve is opened and closed so that the flow of the fluid from the turbine communication pipe toward the first outlet pipe is interrupted and the fluid flows through the first outlet pipe.

3. The gas turbine system according to claim 2,
wherein in a small output operation mode in which the required output for the first gas turbine element and the second gas turbine element is smaller than the predetermined value, an operation of closing the first on-off valve and the second on-off valve and opening the third on-off valve is performed, the fourth on-off valve is opened and closed so that the fluid flows from the second discharge pipe toward the turbine communication pipe and the discharged of the fluid from the second discharge pipe to the outside is interrupted, and the fifth on-off valve is opened and closed so that the fluid flows from the turbine communication pipe toward the first outlet pipe and the flow of the fluid from the combustor toward the first turbine in the first outlet pipe is interrupted.

4. A gas turbine system comprising:
a first gas turbine element which includes a first compressor and a first turbine connected to the first compressor through a first rotation shaft and rotating together with the first compressor;
a second gas turbine element which includes a second compressor and a second turbine connected to the second compressor through a second rotation shaft and rotating together with the second compressor;
a single combustor which is connected to each of the first gas turbine element and the second gas turbine element;
a first supply pipe which connects the first compressor to the combustor and allows air compressed by the first compressor to flow toward an intake port of the combustor;
a second supply pipe which connects the second compressor to the combustor and allows air compressed by the second compressor to flow toward the intake port of the combustor;
a first outlet pipe which connects the combustor to the first turbine and allows air discharged from the combustor to flow toward the first turbine;
a second outlet pipe which connects the combustor to the second turbine and allows the air discharged from the combustor to flow toward the second turbine;
a first discharge pipe which discharges a fluid discharged from the first turbine to the outside;
a second discharge pipe which discharges a fluid discharged from the second turbine to the outside; and
a heat exchanger which allows each of a low-temperature fluid flowing through the first supply pipe and the second supply pipe and a high-temperature fluid flowing through the first discharge pipe and the second discharge pipe to flow therethrough and exchanges heat between the low-temperature fluid and the high-temperature fluid,
wherein the first gas turbine element includes a first generator which is connected to the first rotation shaft and is disposed between the first compressor and the first turbine in an axial direction of the first rotation shaft, and
wherein the second gas turbine element includes a second generator which is connected to the second rotation shaft and is disposed between the second compressor and the second turbine in an axial direction of the second rotation shaft.

5. The gas turbine system according to claim 4, further comprising:
a sixth on-off valve which is provided in the first supply pipe and is able to interrupt the flow of air in the first supply pipe;
a seventh on-off valve which is provided in the first outlet pipe and is able to interrupt the flow of air in the first outlet pipe;
an eighth on-off valve which is provided in the first discharge pipe and is able to interrupt the flow of air in the first discharge pipe;
a ninth on-off valve which is provided in the second supply pipe and is able to interrupt the flow of air in the second supply pipe;
a tenth on-off valve which is provided in the second outlet pipe and is able to interrupt the flow of air in the second outlet pipe; and
an eleventh on-off valve which is provided in the second discharge pipe and is able to interrupt the flow of air in the second discharge pipe,
wherein a first operation mode in which an output value is larger than a predetermined value and a second operation mode in which the output value is smaller than the predetermined value are switchable, and
wherein in the second operation mode, an operation of one of the first gas turbine element and the second gas turbine element is stopped and the on-off valve provided in the supply pipe, the outlet pipe, and the discharge pipe connected to the stopped gas turbine element is closed.

6. The gas turbine system according to claim 2,
wherein the combustor includes a first intake port connected to the first supply pipe, a second intake port connected to the second supply pipe, a first exhaust port connected to the first outlet pipe, a second exhaust port connected to the second outlet pipe, and a shielding wall provided in the combustor, and
wherein the shielding wall divides a space in the combustor into a first space communicating with the first intake port and the first exhaust port and a second space communicating with the second intake port and the second exhaust port.

7. The gas turbine system according to claim 3,
wherein the combustor includes a first intake port connected to the first supply pipe, a second intake port connected to the second supply pipe, a first exhaust port connected to the first outlet pipe, a second exhaust port connected to the second outlet pipe, and a shielding wall provided in the combustor, and
wherein the shielding wall divides a space in the combustor into a first space communicating with the first intake port and the first exhaust port and a second space communicating with the second intake port and the second exhaust port.

8. The gas turbine system according to claim 4,
wherein the combustor includes a first intake port connected to the first supply pipe, a second intake port connected to the second supply pipe, a first exhaust port connected to the first outlet pipe, a second exhaust port connected to the second outlet pipe, and a shielding wall provided in the combustor, and
wherein the shielding wall divides a space in the combustor into a first space communicating with the first intake port and the first exhaust port and a second space communicating with the second intake port and the second exhaust port.

9. The gas turbine system according to claim 5,
wherein the combustor includes a first intake port connected to the first supply pipe, a second intake port connected to the second supply pipe, a first exhaust port connected to the first outlet pipe, a second exhaust port connected to the second outlet pipe, and a shielding wall provided in the combustor, and
wherein the shielding wall divides a space in the combustor into a first space communicating with the first intake port and the first exhaust port and a second space communicating with the second intake port and the second exhaust port.

* * * * *